United States Patent [19]
Belmares et al.

[11] Patent Number: 5,949,518
[45] Date of Patent: Sep. 7, 1999

[54] COLOR-NEUTRAL UV BLOCKING COATING FOR PLASTIC LENS

[75] Inventors: Hector Belmares, Santa Rosa; Peter W. Coldrey, Novato; Lani Sherwood, Sebastopol; Sundar Ram, Petaluma, all of Calif.

[73] Assignee: Sola International, Inc., Menlo Park, Calif.

[21] Appl. No.: 08/855,757

[22] Filed: Feb. 13, 1997

Related U.S. Application Data

[60] Provisional application No. 60/011,537, Feb. 13, 1996.
[51] Int. Cl.$^6$ ........................................................ G02C 7/10
[52] U.S. Cl. .......................................... 351/166; 351/163
[58] Field of Search ................................... 351/163, 164, 351/165, 166

[56] References Cited

U.S. PATENT DOCUMENTS

| | | | |
|---|---|---|---|
| 4,108,827 | 8/1978 | Laliberte | 524/398 |
| 4,139,694 | 2/1979 | Laliberte | 528/280 |
| 4,643,537 | 2/1987 | Vance | 359/722 |
| 5,369,141 | 11/1994 | Coleman et al. | 523/106 |
| 5,371,138 | 12/1994 | Schaefer et al. | 524/739 |

*Primary Examiner*—Scott J. Sugarman
*Attorney, Agent, or Firm*—Burns, Doane, Swecker & Mathis, L.L.P.

[57] ABSTRACT

Polymeric coatings containing both UV absorbers and dyes are employed to produce transparent, durable film coatings that can significantly increase the level of UV radiation blockage when coated onto substrates including ophthalmic lenses. The dye comprises 1-[(4-methylphenyl)amino]-4-hydroxy-9,10-anthracenedione. The color-neutral film coatings are resistant to weather and UV degradation.

9 Claims, 1 Drawing Sheet

COLOR-NEUTRAL UV BLOCKING COATING FOR PLASTIC LENS

REFERENCE TO PROVISIONAL APPLICATION

This application claims the benefit of U.S. Provisional Application Ser. No. 60/011,537 filed Feb. 13, 1996.

FIELD OF THE INVENTION

This invention relates to stable color-neutral, abrasion resistant coatings with ultraviolet radiation blocking properties. Such coatings are useful on substrates such as plastic ophthalmic lenses. The coatings of this invention have a neutral transmittance, a very desirable property particularly when the coating are used with ophthalmic lenses where UV blocking of the UV-A region below about 400 nm is required.

BACKGROUND OF THE INVENTION

Ophthalmic lenses are formed from glass or plastics. Plastics include, for example, polymers based on allyl diglycolcarbonate monomers and polycarbonates. Ophthalmic lenses are formed as a single integral body or as laminated lenses that are fabricated by bonding two lens wafers (i.e., a front wafer and a back wafer) together with a transparent adhesive. Laminated lens wafers are described, for example, in U.S. Pat. Nos. 5,149,181, 4,857,553, and 4,645,317.

Commercially available plastic ophthalmic lenses are commonly coated with a thin polymeric scratch resistance coating. The thickness of the polymeric scratch resistance coating will depend, in part, on the substrate material. Abrasion resistant radiation curable coatings for polycarbonate substrates are described, for example, in U.S. Pat. No. 4,954,591. The vast majority of ophthalmic lenses are clear.

Absorption of ultraviolet radiation, especially those having higher wavelengths, by the retina is believed to accelerate or cause retinal injuries such as macular degeneration. Specifically, epidemiological data correlates UV sunlight exposure with the incidence of lenticular opacities (cataracts) and possibly with pseudo-exfoliation in the eyes.

Consequently, there is a demand for finished eyeglass lenses, including sunglasses, with UV-A absorption capabilities. Conventional methods of fabricating plastic lenses with UV protection have added UV absorbers into the casting monomer systems that form the ophthalmic lenses. Unfortunately, UV absorbers can interact with the casting monomer system thereby blocking complete polymerization. This results in a variety of lens defects including softness. The effect is exacerbated in prescription lenses where the thicker regions of the lens will emit a more intense yellow color. The lens will provide UV-A protection but will be aesthetically undesirable.

U.S. Pat. No. 5,013,608 describes a coating composition containing at least about 3% to about 20% (wt) of coating solids of a tintability enhancing compound (i.e., UV absorbers) in a base resin comprising an aqueous, aqueous-alcoholic, or alcoholic dispersion of colloidal silica, or a mixture of colloidal silica with a metal oxide, and a partial condensate of an epoxy-functional silanol which is blended with a partial condensate of another silanol. A crosslinking agent and a curing catalyst are added to form purportedly highly tintable abrasion resistant coating compositions. The coating composition upon curing is alleged to form hard films that provide both abrasion resistance and high levels of tinting and, optionally, absorbance of ultraviolet radiation. Although this coating composition may be suitable for fabricating tinted articles such as sunglasses, it is not suitable for fabricating non-tinted articles. The reason is that these hard films invariably exhibit a yellowish hue.

U.S. Pat. No. 5,371,138 describes a UV absorbing polysiloxane resin composition for coating transparent sheets and plastic spectacle lenses. It is formed by adding water-based colloidal silica to a silanol blend, heating, incorporating additives and incorporating a UV absorbing material such as 2,2',4,4'-tetrahydroxy-benzophenone, benzothiazoles and benzotriazoles, U.S. Pat. No. 4,233,441 describes an acryloxybenzothiazole copolymerizable UV light absorber that can be copolymerized with monomers and oligomers by free radical or radiation curing. JP Patent 55093447 describes polycarbonate articles that are coated with an adhesive and an overcoat, which contains a benzotriazole-type UV absorber. This apparently prevents the substrate from dusting, alkali and solvent attack, and yellowing. U.S. Pat. No. 4,216,267 describes a laminate that comprises a sheet of clear PVC or polycarbonate with a 0.1–10 mil thick coating of an acrylic polyurethane and an acrylic UV absorber. U.S. Pat. No. 4,202,834 describes a copolymerizable UV light absorber, cyanodiphenyl-acryloxy-alkyl-allyl or substituted allyl ether, purportedly useful in providing UV protection to radiation cured coatings. U.S. Pat. No. 4,284,485 describes a polyalkylpiperidine derivative as a UV absorber useful in coatings that are applied to various materials. JP Patent 50054670 describes polycarbonate moldings coated with solutions prepared by mixing siloxanes and UV absorbers (benzophenones, triazoles, and salicylates). A preferred UV absorber is 2-hydroxy-4-octoxybenzophenone is claimed as one of the examples. U.S. Pat. No. 5,013,608 describes a coating composition containing 3–20% by weight (of coating solids) of a UV absorber used as a tintability enhancer.

As is apparent, the prior art methods of fabricating films with UV radiation blocking properties are deficient in a number of respects. First, for UV absorbers which are colorless or nearly colorless, UV blocking is incomplete in the UV-range of 290 nm–380 nm and at longer wavelengths. These UV absorbers exhibit maximum absorption at relatively short wavelengths in the UV spectrum. Subsequently, these UV absorbers have the undesirable side effect of imparting a yellow hue to the coating at the concentrations needed for full UV blocking at these ranges. UV absorbers demonstrating incomplete UV-A blocking include acrylics, benzothiazoles and benzotriazoles, HALS (hindered amino light absorbers), monohydroxy benzophenones and salicylates.

Second, when a UV absorber is capable of blocking the full UV-A range due to an absorption maximum at relatively long UV wavelengths, the UV absorber is yellow and imparts a yellow hue to the coating. This is caused by the absorption of visible light, particularly in the blue region (wavelengths above 400 nm) by these UV absorbers. This is particularly problematic for ophthalmic lenses where coatings are relative thin, e.g., from 0.1 $\mu$m to 25 $\mu$m, and if full blocking of the UV-A range or at longer wavelengths is desired, the UV absorbers must have a strong absorption in those wavelength ranges. UV-A absorbers in this latter category include the dihydroxy benzophenones such as 2,2',4,4'-tetrahydroxy-benzophenone.

SUMMARY OF THE INVENTION

This invention is based in part on the discovery that the polymer compositions having both UV absorbers and dyes can be employed to produce transparent, durable films that can significantly increase the level of UV radiation blockage when coated onto substrates including ophthalmic lenses. A feature of the invention is that the addition of the dyes to the polymer compositions significantly enhances the optical qualities of the films by producing a stable, weather resistant coating that is color-neutral, that is, the coating does not exhibit a hue.

In one aspect, the invention is directed to a composition suitable for forming a stable color-neutral, transparent coating which includes:

(a) a polymeric composition;
(b) an ultraviolet absorber;
(c) an effective amount of a dye comprising 1-[(4-methylphenyl)amino]-4-hydroxy-9,10-anthracenedione to neutralize yellow color caused by said ultraviolet absorber; and
(d) a solvent.

In another aspect, the invention is directed to a transparent article exhibiting low ultraviolet radiation transmittance which includes:

(a) a substrate; and
(b) a stable color-neutral coating on a surface of said substrate wherein the coating includes:
  (i) a polymeric matrix;
  (ii) an ultraviolet absorber; and
  (iii) an effective amount of a dye comprising 1-[(4-methylphenyl)amino]-4-hydroxy-9,10-anthracenedione to neutralize yellow color caused by said ultraviolet absorber.

In a further aspect, the invention is directed to a method of fabricating a transparent article exhibiting low ultraviolet radiation transmittance which comprises the steps of:

(a) providing a substrate; and
(b) preparing a stable color-neutral coating on a surface of said substrate wherein the coating comprises:
  (i) a polymeric matrix;
  (ii) an ultraviolet absorber; and
  (iii) an effective amount of a dye comprising 1-[(4-methylphenyl)amino]-4-hydroxy-9,10-anthracenedione to neutralize yellow color caused by said ultraviolet absorber.

A preferred method of preparing the stable color-neutral coating is by a process comprising:

(i) preparing a composition comprising a polymeric material, an ultraviolet absorber, an effective amount of a dye comprising 1-[(4-methylphenyl)amino]-4-hydroxy-9,10-anthracenedione to neutralize yellow color caused by said ultraviolet absorber, and a solvent;
(ii) coating a layer of the composition on a surface of the substrate; and
(iii) removing solvent from the layer to form the coating.

Preferred ultraviolet absorbers include 2,2'-dihydroxy-4-methoxy benzophenone, 2,2'-dihydroxy-4,4'-dimethoxy benzophenone, 2,2',4,4'-tetrahydroxy benzophenone, and mixtures thereof. Preferred polymeric materials include silanols, epoxies, acrylates, methacrylates, polyurethanes, melamines, and mixtures thereof.

Preferably, for transparent plastic ophthalmic lens, the color-neutral coating has a UV absorbance of about 98% or more (2% UV transmittance or less) measured at 380 nm and the coating is about 1.5 to about 5.0 $\mu$m thick. (Transmittance is defined in accordance with ANSI Z 80.1-1995). The coating can substantially absorb UV-A (315 nm–380 nm) and UV-B (290 nm–315 nm) radiation.

The coatings have excellent weatherability, adhesion and abrasion resistance. The blue dyes for these applications are most preferably UV-resistant to avoid degradation of the dye with the consequent destruction of the neutral transmittance. The blue dye is resistant to degradation or change of color by the coating curing conditions and to the catalysts that bring about this curing. The UV absorbers must be also weather and coating-curing resistant and most preferably should be UV stabilizers such as the dihydroxy benzophenones. The coatings used in this invention can be tintable or non-tintable.

DETAILED DESCRIPTION OF THE PREFERRED EMBODIMENTS

Figure 1:
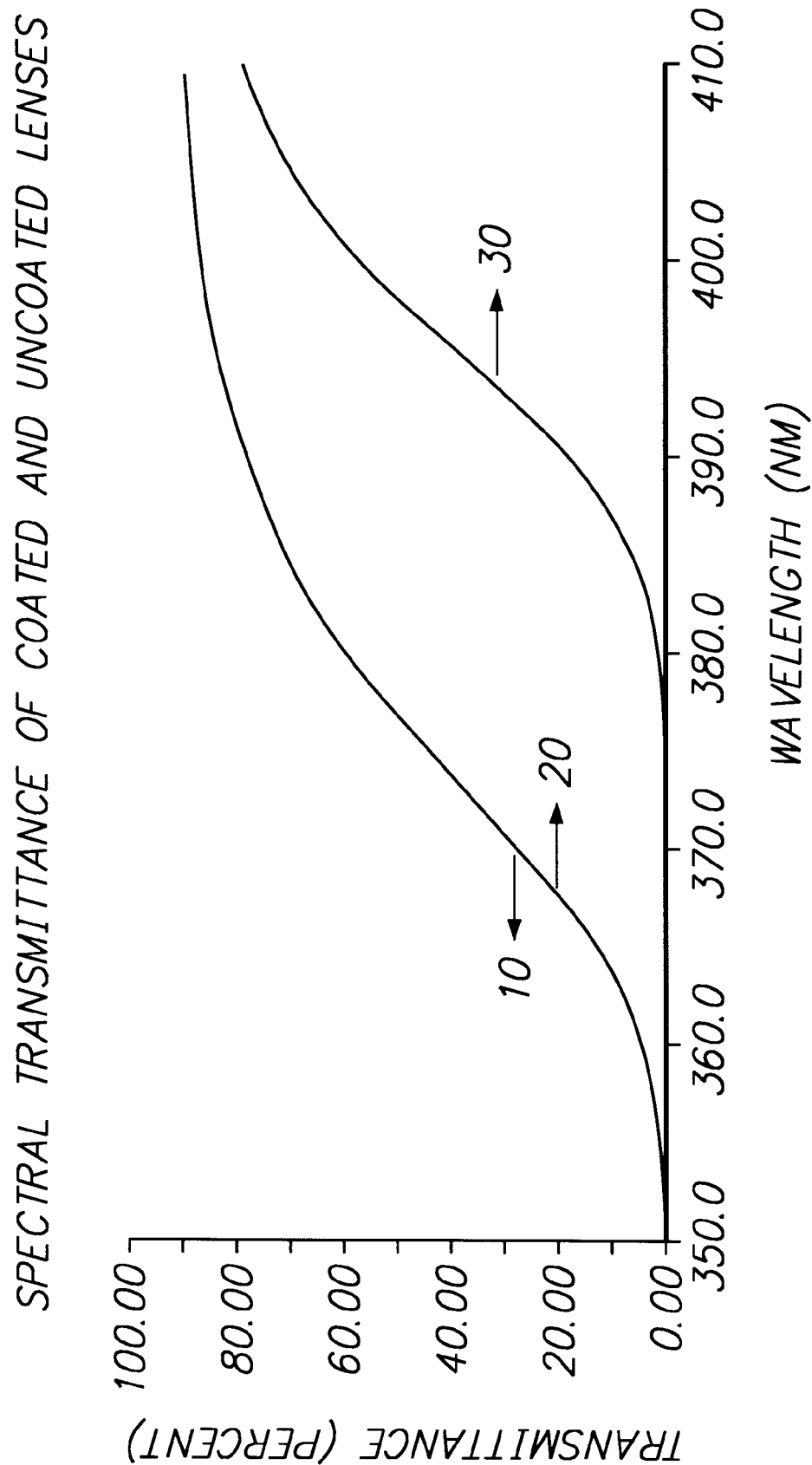
FIG. 1 is a graph illustrating the spectral transmittance of an uncoated lens and of hard coated lenses (with and without UV absorbers).

This invention is directed to articles or substrates that are coated with a clear transparent, durable, abrasion resistant film (also referred to as a hard coating) which has ultraviolet radiation absorbing properties. This film can be coated onto any suitable substrate such as plastic ophthalmic lenses. The film is prepared from a hard coating composition which comprises a mixture of a polymeric composition, an ultraviolet absorber, and a dye. Incorporation of the UV absorber not only significantly reduces UV transmittance, but it also improves the durability of the coated substrate to environmental exposure. The inventive coating apparently shields the coating/substrate interface, which is vulnerable to UV degradation, to excessive exposure to UV radiation. Furthermore, incorporation of the dye to the coating composition provides a neutral color to the coating. The dye effectively eliminates the yellow hue that is characteristic of prior art hard coatings and systems where UV cutoff is achieved by adding the UV absorbers to the monomers.

However, prior to describing the invention in further detail, the following terms will be defined:

The term "substrate" refers to a material which preferably has superior structural and optical properties. Crystalline quartz, fused silica, soda-lime silicate glass, and plastics such as from polymers based on allyl diglycol carbonate monomers (available as CR-39™ from PPG Industries, Inc., Hartford, Conn.) and polycarbonates such as Lexan™, available from General Electric Co., are preferred substrate materials. Substrates include ophthalmic lenses (including sunglasses). Preferred ophthalmic lenses also include laminated lenses that are fabricated by bonding two lens wafers (i.e., a front wafer and a back wafer) together with a transparent adhesive. Laminated lens wafers are described, for example, in U.S. Pat. Nos. 5,149,181, 4,857,553, and 4,645,317 and U.K. Patent Application, GB 2,260,937A, all of which are incorporated herein. Suitable substrates further include glass ophthalmic lenses, as described, for instance, in U.S. Pat. Nos. 3,899,315 and 3,899,314, both of which are incorporated herein. Another preferred ophthalmic lens is a plastic lens available as Spectralite™ from SOLA Optical USA and is described in U.S. Pat. No. 5,373,033. As used herein, the term "lens" refers to both single integral body and laminated types.

The material and dimensions (e.g., thickness) of the substrate employed will influence the formulation of the coating composition. Specifically, most glasses, for example, absorb ultraviolet light having a wavelength of less than about 260 nm. Thus, the UV absorber used need only be effective for many applications above about 250 nm in this case. Conversely, many plastics will transmit ultraviolet light having a wavelength of less than 260 nm. Thus, the type of UV absorber can be selected accordingly. Finally, since natural sunlight only has ultraviolet light having a wavelength of about 290 nm and about 400 nm, for ophthalmic lens coatings, the UV absorber employed must be effective in this range.

The term "coating polymeric composition" or "polymeric composition" refers to a composition that comprises monomers, oligomers, polymers, and mixtures thereof, which forms the polymeric structure of the inventive durable, abrasive resistant coatings which are also referred to as hard coatings. Preferably the monomers, oligomers, and/or polymers can be cured by heat, and/or actinic radiation. Initiators and/or catalysts can be added to facilitate polymerization and crosslinking. Preferred monomers, oligomers, and/or polymers for the polymeric composition include, for example, silanols, epoxies, acrylates, methacrylates, melamines, polysiloxanes, polyurethanes, and mixtures thereof. Preferred siloxanes include, for example, $R_1SiO_{1.5}$ and $R_1R_2SiO$ in which $R_1$ and $R_2$ are each independently selected from suitable functional groups including, for example, gammaglycidoxypropyl, methyl, phenyl, ethyl, propyl, and methacryloxypropyl.

Polysiloxanes are particularly suited for fabricating hard coatings for plastic lens. A preferred polysiloxane resin is available as TS-56HF (Tokuyama Corporation, Japan). This product comes as two separate components A and B, one being the polymer system and the other being a catalyst solution. Coating polymeric compositions are further described in U.S. Pat. Nos. 4,954,591 and 5,013,608, which are incorporated herein. The resin composition preferably includes a solvent to facilitate coating the resin composition onto a substrate surface. Suitable solvents include, for example, alcohols, glycol ethers, and acetates (e.g., propyl and butyl).

The term "ultraviolet absorber" or "UV absorber" refers to any suitable substance that absorbs ultraviolet radiant energy, then dissipates the energy. Preferred ultraviolet absorbers include, for example, substituted benzophenones, benzotriazoles and diphenyl acrylates and substituted or unsubstituted dihydroxy benzophenones. Particularly useful dihydroxy benzophenones have the structure:

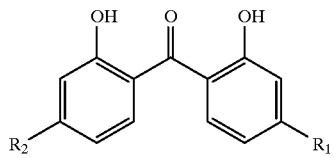

preferably where $R_1$ and $R_2$ are each independently selected from the group consisting of H, OH, and an alkoxy (i.e., $OC_nH_{2n+1}$) having 1 to 12 carbons.

Preferred dihydroxy benzophenones include 2,2'-dihydroxy-4-methoxy benzophenone available as Cyasorb UV 24™ from Cytec Corporation, 2,2'-dihydroxy-4,4'dimethoxy benzophenone available as Uvinul D-49™ from BASF Corp., and 2,2',4,4'tetrahydroxy benzophenone available as Uvinul 3050™ (BASF), and mixtures thereof. Use of tetrahydroxybenzophenones in the coating provides for both a UV cut-off less than 400 nm and a smooth, clear, cosmetically superior coated film.

The amount of incident ultraviolet light blocked by the inventive coating can vary depending, for example, on the thickness of the coating and the amount of UV absorbers employed. For ophthalmic lenses, an absorbance of about 98% or more (2% UV transmittance or less) measured at 380 nm is preferred. The coating can substantially absorb radiation in both the UV-A and UV-B regions.

The term "dye" generally refers to any suitable substance that neutralizes the yellow color caused by some UV absorbing materials. Preferred dyes include, for example, blue dyes or a mixture of solvent soluble dyes imparting a blue hue. The blue dye is used in combination with the dihydroxy benzophenones to obtain a neutral color must be also compatible with the coatings to obtain transparent coatings and preferably must be weather resistant. A large proportion of prior art blue dyes are not weather resistant. Non-weather resistant dyes will degrade over a short time relative to the life of the coated article (e.g., ophthalmic lens) so that the yellow color that was being neutralized becomes evident. Further, the by-product of the degradation may also contribute to intensify the yellow hue. The blue dyes must also be resistant to chemical degradation or change of color by ingredients in the coating which normally are very aggressive such as acids, free radicals, and bases. The blue dyes must resist heat and actinic radiation used to cure polymeric compositions. A particularly useful blue dye which exhibit these characteristic is comprised of 1-[(4-methylphenyl)amino]-4-hydroxy-9,10-anthracenedione that is available as Kayaset Blue A-2R™ (Nippon Kayaku, Japan) and which has the following structure:

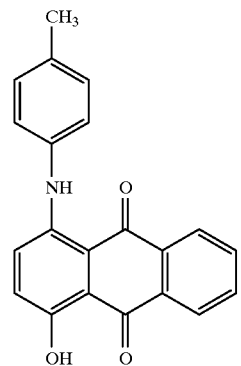

Many organic dyes are sensitive to the elements, particularly to UV radiation. This is due to the high electron mobility in these dyes which accounts for their visual color and to the presence of anilino, imino, and similarly UV sensitive chemical groups. Without being bound by theory, the above referenced anthraquinone derivative is UV resistant because of the presence within the molecule of a hydroxybenzophenone moiety similar to the one present in UV absorbers that protect against UV radiation. This chemical group converts UV radiation to non-UV radiation and heat as in the case of ordinary 2-hydroxy benzophenones.

METHODOLOGY

The process of fabricating an article coated with a transparent, durable abrasion resistant film comprises forming a homogeneous coating polymeric composition comprising the polymeric composition, UV absorber, dye and solvent. Appropriate initiators and/or catalysts are included where necessary. The mixture is evenly coated onto a substrate, e.g., plastic lens, by conventional means such as spin coating or dip coating. The composition is cured to produce a hard coating film. It has been demonstrated that the UV 380 nm cutoff and higher ophthalmic performance are achieved without the yellowing of the hard coating. The coatings can be tinted if desired, for instance, to make "sunglasses." They can be thermoplastic or thermoset, polymerizable or already polymerized, crosslinkable and non-crosslinkable. When curing is needed, the coatings can be cured by the known processes such as by thermal energy or actic radiation. Radiation and thermally curable coatings are preferred. The coatings can be single layered or multilayered.

Typically, the homogeneous coating polymeric composition comprises about 40% to 85% solvent, preferably about 70%. (All percentages herein are based on weight.) The proportion of solvent used will depend, in part, on the solubility of the UV absorber and other components. Following removal of the solvent, the coating preferably comprises about from 0.5% to 50%, more preferably from 2% to 35% and most preferably from 6% to 25% of the UV absorber. High UV absorber levels approaching 50% are to be avoided since this will decrease the abrasion resistance of the coating and consequently reduce the adhesion of the coating to the substrate. The blue dye preferably comprises from about 0.001% to 0.2% and more preferably from 0.001% to 0.1% of the coating. The balance of the coating comprises predominantly of the polymer matrix. There is generally an inverse relationship between the concentrations of the UV absorber and dye and the thickness of the coating. Specifically, if a thin coating is desired or necessary for a particular application, then high concentrations of UV absorber and dye are required to achieve a desired level of UV blocking.

Typically the color-neutral, transparent coating has a thickness that ranges from about 0.1 to 20 $\mu$m, and more preferably from 0.8 to 5 $\mu$m. The coating is expected to be stable or weather resistant in that it will remain substantially color-neutral for the expected life of the article or substrate that is coated. For ophthalmic lenses, it is expected to be stable for at least about 1 to 2 years, preferably for about 2 to 3 years. Further, the coatings are resistant to weather and UV degradation with respect to both physical and optical characteristics.

It is expected that a coating composition comprising a catalyzed polymer, UV absorber, and dye, that is maintained at ambient temperature, can be employed for continuous coating applications. Indeed, for large scale coating of ophthalmic lenses, it is expected that up to 100 liters or more of such a coating composition can be formulated and employed to continuously coat lenses without significant loss of the composition due to excessive polymerization prior to being coated. The coating formulation (e.g., viscosity) can be adjusted so that uniform, thin films can be produced.

The UV absorber does not adversely affect the polymerization of the polymeric composition. Further, the dye remains stable in the resin composition and subsequent abrasion resistant coating. The latter was unexpected since when blue dyes are added to a monomer cast composition containing allyl diglycol carbonate monomers, which is commonly employed to prepare ophthalmic lens, the dyes are degraded by the polymerization initiators.

An important advantage to mixing the dye with the polymeric composition and UV absorber is that this produces color-neutral, UV blocking, abrasion resistant coatings of consistent quality. It has been found that coating compositions without the dyes produce coatings that have a yellow hue. Furthermore, the process of dipping the substrate into the dye solution is not acceptable for producing clear, non-tinted lenses because the necessary color absorption is inconsistent from batch to batch and, indeed, within a given batch of lenses.

EXPERIMENTAL

Example 1

A polymeric coating composition comprising 100 grams of the TS-56HF™, 3.13 grams of the UVinul 3050™, and 0.01 grams of the Kayaset Blue A-2R™ was prepared as follows: the components A and B of the TS-56HF™ resin were mixed together and stirred slowly for 24 hours at ambient temperature. The weighed amount of the UV absorber is then added slowly to the resin solution. Upon completing the addition, the solution is stirred for 30 minutes more. Then, the blue dye is added to the resin solution and stirred for 30 minutes. At this point, the solution is ready for coating application.

Referring to FIG. 1, this graph shows the transmittance spectrum curves from an uncoated lens (10), a hard coated lens without UV absorber and the dye (20), and a hard coated lens with UV absorber and blue dye (30). The lenses employed were fabricated from poly (diethylene glycol diallyl carbonate). Each lens prior to coating was about 2 mm. thick. A coating solution without the UV absorber and dye was used to coat a lens (20). A second solution with the UA absorber and dye was coated on another lens. Both coatings had a thickness of 2 $\mu$m. The hard coating which did not have the UV absorber and dye exhibited a yellowish hue whereas the hard coating which included the UV absorber and dye was color neutral.

Measurements show that the transmittance for the uncoated lens (curve 10) was almost identical to that of the lens that was coated with the hard coating not having the UV absorber and dye (curve 20). In contrast, the inventive lens coated with a hard coating with the UV absorber and dye (curve 30) shows a transmittance of less than 2% at 380 nm. The inventive coated lens also exhibits good abrasion resistance properties.

In the following Examples 2–4, the weather resistance of the inventive coating are demonstrated. Inventive and comparative lens substrates were subjected to various physical and optical tests, the procedures of which are described as follows:

1. Abrasion resistance test: A proprietary and automated scrubber having a steel wool #00 surface was utilized. Each sample was scrubbered 75 cycles with the steel wool. Thereafter, abrasion was detected by visual inspection and graded in accordance with the following scale: A-No scratches sustained with rubbing; B-Scratches sustained slightly with rubbing; and C-Scratches sustained even with weak rubbing. (Uncoated CR-39 lenses are in this category.)

2. Adhesiveness test: The so-called cross-cut tape test, where 11 parallel lines each in two perpendicularly crossing directions are cut with a sharp razor blade, was employed. The lines are cut at fixed intervals of approximately 1 mm, on the surface of the coating of a given sample to produce a total of 100 squares. Thereafter, adhesive cellophane tape is applied to the cut squares, the tape is peeled, and the squares on which the coat film remains are counted. The adhesiveness is measured by the number of squares remaining.

3. Hot water resistance test: A sample is placed in boiling water for one hour.

4. Yellowness index and white light transmittance test: This test employed a Gardner Pacific Colorimeter XL 835.

5. Transmittance at 380 nm test: Spectrophotometric transmittance measured at 380 nm.

6. Weathering test: Samples were placed outdoors for five weeks, thereafter, the yellowness index or microcracking of the coatings were measured.

Example 2

CR-39 plano lenses, 70 mm in diameter and 2 mm in thickness, which had been dipped in an aqueous 35% potassium hydroxide solution at 40° C. for 60 seconds and then washed, were spin coated with a polymeric composition comprising hydrolyzed gamma-glycidoxypropryl trimethoxysilane dissolved in methoxypropanol and then cured at 95° C. for 4 hours. The solids content for polymeric composition was 30%. The coating thickness was 2.3 $\mu$m.

Similarly, after caustic etching, another set of plano lenses were coated with the same polymeric composition but further including a UV absorber (Cyasorb UV 24™) and dye (Kayaset Blue A-2R™. The coated lenses were cured in an oven at 95° C. for 4 hours. The coating thickness was 2.3 $\mu$m. The coating contained approximately 21.3% UV absorber and 0.021% dye. The lenses that contained the UV absorber with the blue dye had a neutral color. The test results were as follows:

|  | (Comparative) coated, no additives | (Inventive) coated, UV absorber and blue dye |
|---|---|---|
| yellowness index | 1.4 | 1.0 |
| transmittance, % white light | 92 | 92 |
| abrasion resistance | A | A |
| adhesiveness | 100 | 100 |
| hot water resistance | 100 | 100 |
| weathering test, 5 weeks | no change | no change |
| transmittance, %, at 380 nm | 24 | 0.2 |

As is apparent, the inventive coating provided excellent UV blocking and other optical properties.

Example 3

Caustic-etched and washed CR-39 plano lenses prepared as in Example 2 were coated with a polymeric coating composition comprising 100 grams of TS-56HF™, 3.13 grams of Uvinul 3050™ and 0.01 grams of Kayaset Blue A-2R™. An identical control lens without adding the UV absorber and the blue dye to the composition were also coated. The spin-coated lenses were cured in an oven. The coating thickness for both cases was 2 $\mu$m. The inventive coating contained approximately 9.5% UV absorber and 0.03% dye. The lenses with UV absorber and the blue dye had a neutral color. The test results are as follows:

|  | (Comparative) coated, no additives | (Inventive) coated, UV absorber and blue dye |
|---|---|---|
| yellowness index | 1.2 | 1.0 |
| transmittance, % white light | 92 | 92 |
| abrasion resistance | A | A |
| adhesiveness | 100 | 100 |
| hot water resistance | 100 | 100 |
| weathering test, 5 weeks | no change | no change |
| transmittance, %, at 380 nm | 27 | 1.5 |

Again, as in Example 2, the inventive coating provided excellent UV blocking and other optical properties.

Example 4

Spectralite™ plano lenses, from SOLA Optical USA, 2 mm in thickness, were surface-treated and then spin-coated with TR-65™, a siloxane coating composition, available from Transitions Corporation. It should be noted that an uncoated Spectralite™ lens by itself has UV-A blocking capabilities. Another set of Spectralite™ plano lenses was also coated with TR-65™ that contained UV absorbers comprising Cyasorb UV 24™ and Uvinul 3050™, and Kayaset Blue A-2R™. The spin-coated lenses for both formulations were cured in an oven at 105° C. for 4 hours. The coating thickness was 2.2 $\mu$m for all lenses. The inventive coatings contained approximately 19% Cyasorb UV24™, 23% Univul 2050™, and 0.08% dye. The lenses were all color neutral. The results of the tests are as follows:

|  | (Comparative) coated, no additives | (Inventive) coated, UV absorber and blue dye |
|---|---|---|
| abrasion resistance | A | B–C |
| adhesiveness | 100 | 95 |

As is apparent, high levels of UV absorber content adversely affected the abrasion resistance and adhesiveness.

Example 5

Inventive coated lenses prepared by the methods described in Examples 1, 2 and 3 were subjected to accelerated testing by exposure to radiation from a xenon lamp (without filter) in a Heraeus™ accelerated weathering device manufactured by DSET Laboratory. After 250 hours, the lenses continued to exhibit excellent UV blocking without loss of white light transmittance or color neutrality.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A transparent article exhibiting low ultraviolet radiation transmittance which comprises:
   (a) a substrate; and
   (b) a stable color-neutral coating on a surface of said substrate wherein the coating comprises:
      (i) a polymeric matrix;
      (ii) an ultraviolet absorber; and
      (iii) an effective amount of a dye comprising 1-[(4-methylphenyl)amino]-4-hydroxy-9, 10-anthracenedione to neutralize yellow color caused by said ultraviolet absorber.

2. The article of claim 1 wherein the ultraviolet absorber absorbs radiation substantially in the entire range between about 290 nm and 380 nm.

3. The article of claim 1 wherein the ultraviolet absorber is selected from the group consisting of 2,2'-dihydroxy-4-methoxy benzophenone, 2,2'-dihydroxy-4,4'-dimethoxy benzophenone, 2,2',4,4'-tetrahydroxy benzophenone, and mixtures thereof.

4. The article of claim 1 wherein the polymeric composition comprises material selected from the group consisting of silanols, epoxies, acrylates, methacrylates, polyurethanes, melamines, and mixtures thereof.

5. The article of claim 1 wherein the substrate is an ophthalmic lens.

6. The article of claim 5 wherein the coating has a thickness of about 0.8 μm to 20 μm.

7. The article of claim 5 wherein the ophthalmic lens is made of material selected from the group consisting of allyl diglycol carbonate monomers and polycarbonates.

8. The article of claim 3 wherein the polymeric composition comprises material selected from the group consisting of silanols, epoxies, acrylates, methacrylates, polyurethanes, melamines, and mixtures thereof.

9. The article of claim 1 characterized in that the coating remains color neutral for at least about 1–2 years.

* * * * *